United States Patent
Nicoll

[15] 3,657,735
[45] Apr. 18, 1972

[54] ELECTRON BEAM EXCITED LASER

[72] Inventor: Frederick Hermes Nicoll, Princeton, N.J.
[73] Assignee: RCA Corporation
[22] Filed: Mar. 20, 1970
[21] Appl. No.: 21,292

[52] U.S. Cl. .....................331/94.5, 313/235.27, 313/108 D
[51] Int. Cl. .......................H01s 3/05, H01s 3/09, H01s 3/18
[58] Field of Search..........................331/94.5; 317/235.27; 313/108 D

[56] References Cited

UNITED STATES PATENTS

| | | | |
|---|---|---|---|
| 3,349,339 | 10/1967 | Thorington | 331/94.5 |
| 3,382,454 | 5/1968 | Wade et al. | 331/94.5 |
| 3,393,373 | 7/1968 | Stimler | 331/94.5 |

Primary Examiner—Ronald L. Wibert
Assistant Examiner—R. J. Webster
Attorney—Glenn H. Bruestle

[57] ABSTRACT

An electron beam excited laser element including a body of a material which is capable of generating light when excited by an electron beam and having a pair of opposed, substantially parallel, spaced surfaces. A partially reflective layer is provided on one surface of the body to allow emission of a portion of the light from the body. A metal layer is provided over the other surface of the body with at least a portion of the metal layer being spaced from the surface of the body. The metal layer is substantially fully light reflective but transmits the electrons of the electron beam with little loss. When an electron beam is directed at the spaced portion of the metal film, the material of the body is excited to generate light which is emitted through the partially reflective layer. The spacing of the metal layer from the surface of the body reduces the electron beam power necessary to cause lasing of the element.

7 Claims, 3 Drawing Figures

Patented April 18, 1972

3,657,735

INVENTOR.
FREDERICK H. NICOLL
BY
Donald S. Cohen
Attorney

ELECTRON BEAM EXCITED LASER

BACKGROUND OF INVENTION

The present invention relates to an electron beam excited laser, and more particularly to a laser element for an end pumped type of electron beam excited laser.

A laser operating in the Fabry Perot mode in general comprises an active excited region bounded by parallel reflecting surfaces which form the optical cavity. In an electron beam excited laser of the end pumped type lasing is achieved by bombarding one of the surfaces with a stream of electrons with the light being emitted from the other surface. In such a laser the bombarded surface should not only reflect light efficiently but also must transmit the exciting electrons efficiently. Also, it is desirable that the electron permeable surface be electrically conducting to prevent charging of the surface under electron bombardment. The light emitting surface must be partially transparent to the light generated so as to emit the light. These surfaces are generally films of a light reflecting metal coated on opposed surfaces of the body of a material which will generate light when excited by an electron beam. The metal film on the bombarded surface is sufficiently thick so as to be practically opaque to light but still be relatively transparent to the bombarding electrons. The metal film on the other surface is thinner so as to permit some transmission of the generated light therethrough. A problem with this type of laser is that it requires a relative high energy level of the bombarding electrons to achieve lasing. For example, such a laser which comprises a body of a CdS single crystal a few microns thick coated on its bombarded surface with a film of aluminum 1,000 A thick and on its emitting surface with a film of aluminum 200 A thick requires more than 25 kilovolt electrons focused to a current density of 5 to 10 amps/cm$^2$ in order to reach lasing threshold.

SUMMARY OF INVENTION

An electron beam excited laser element which comprises a body of a material which will generate light when excited by an electron beam. A light reflective, electron permeable layer of an electrically conductive metal covers a surface of the body and has at least a portion thereof spaced from the surface of the body.

DETAILED DESCRIPTION

Figure 1:
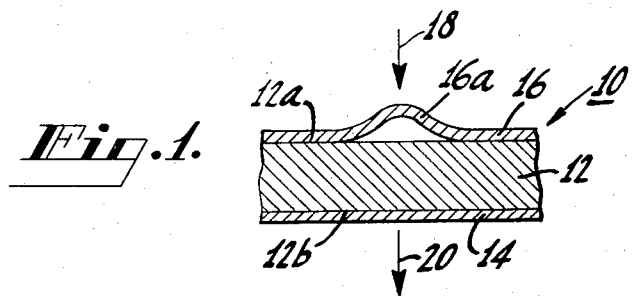
FIG. 1 is a sectional view of one form of the laser element of the present invention.

Referring to FIG. 1, one form of the electron beam excited laser element of the present invention is generally designated as 10. Laser element 10 comprises a body 12 of a material which will generate light when excited by an electron beam. Such materials include single crystals of certain semiconductor materials, such as cadmium sulfide, zinc oxide, zinc sulfide, gallium arsenide and combinations of these compounds. The body 12 has a pair of substantially parallel, spaced surfaces 12a and 12b. On the surface 12b of the body 12 is a layer 14 of a material which will partially reflect light and will partially transmit light therethrough. It is preferable that the layer 14 be capable of reflecting most of the light which strikes the layer and transmitting only a small portion of the light. As is well known in the optical field, the layer 14 may be a thin film of a metal, such as aluminum, beryllium or silver, or a multilayer film of dielectric materials, such as silicon oxide or magnesium fluoride with zinc sulfide, or a combination of a metal film and a dielectric layer. The layer 14 constitutes the light emitting surface of the laser element 10.

Covering the surface 12a of the body 12 is a layer 16 of a material which will substantially fully reflect light but which will transmit electrons. The layer 16 constitutes the electron bombarded surface of the laser element 10. Therefore it is preferable that the layer 16 be of an electrically conductive material so as prevent charging of the surface under electron bombardment. The layer 16 can be a film of an electrically conductive metal, such as aluminum, beryllium or silver, which is of sufficient thickness to be light reflective but electron transmissive. In accordance with the present invention, the layer 16 has at least a portion thereof which is spaced from the surface 12a of the body 12. In the laser element 10 the spaced portion of the layer 16 is in the form of a bubble 16a. Although the layer 16 is shown as having only one bubble 16a, it may have a plurality of bubbles spaced over its entire surface area.

In the use of the laser element 10, the metal layer 16 is bombarded with a stream of electrons as indicated by the arrow 18. The stream of electrons can be provided by any well known electron emitting device, such as an electron gun of the type commonly employed in cathode ray tubes or a magnetic particle accelerator. The electrons pass through the metal layer 16 into the body 12 to excite the material of the body. When the power of the bombarding electrons reaches a certain level, which depends on the particular material of the body 12, the material of the body will reach its lasing threshold and coherent light will be emitted from the laser element 10 through the layer 14 as indicated by the arrow 20. The light will be emitted from the area of the layer 14 opposite to the area of the metal layer 16 which is bombarded by the electrons.

It has been discovered that when the spaced portion 16a of the metal film 16 is bombarded by the electrons the electron power per unit area needed to cause the body 12 to reach its lasing threshold is much less than is required when the electron beam is directed at a metal film which is in direct contact with the body. For example, for a lasing element 10 having a body 12 of a single crystal of CdS and a layer 16 of a film of aluminum, it was found that when an electron beam of a given current density was directed at a portion of the metal layer which was flat against the surface of the body, the voltage necessary to achieve lasing was greater than 25 kilovolts at both a temperature of 296° K and a temperature of 77° K. However, when the electron beam of the same current density was directed at a portion of the metal layer spaced from the surface of the body, such as the bubble 16a, the voltage which achieved lasing was 9 kilovolts at a temperature of 296° K and 5 kilovolts at a temperature of 77° K. Thus it can be seen that by having the bombarded metal film 16 spaced from the surface of the body 12 and directing the electrons through the spaced portion of the metal film, the power necessary to achieve lasing greatly reduced.

Although the reason for the decrease in the required power for lasing when the electron beam is directed at the spaced portion of the metal film is not clearly understood at this time, it appears to be from interference enhanced reflection from the metal film and the body surface which when properly spaced can give nearly 100 percent reflection. The proper spacing to give in-phase enhancement requires a total phase difference of 360°. Of this, approximately 180° occurs on reflection at the metal film surface and the remainder by the path difference, 180° in-phase, in going through the space between the metal film and the body. On this basis, maximum reflection would be obtained when the spacing between the metal film and the body is one-fourth of the wavelength of the light generated in the body.

The laser element 10 is formed by coating the surfaces 12a and 12b of the body 12 with the metal layer 16 and layer 14 using any well known technique for coating the particular materials of the layers, such as by the well known techniques of vacuum evaporation.

One method in which the bubble 16a has been formed in the metal layer 16 was by focused electron beam heating the area of the metal film where the bubble is to be provided. This heating either expands the metal film locally or expands residual gas under the film to form the bubble. Another method by which the bubble can be formed is to first apply small dots of an easily vaporized material, such as collodion, ethyl celluose, on the surface 12a of the body 12 where the bubble or bubbles are to be provided. The metal film is then coated on the surface 12a and over the dots. The laser element is then heated under controlled conditions in a furnace to vaporize the material of the dots and form the bubbles, and if necessary to oxidize the carbonaceous material.

Figure 2:
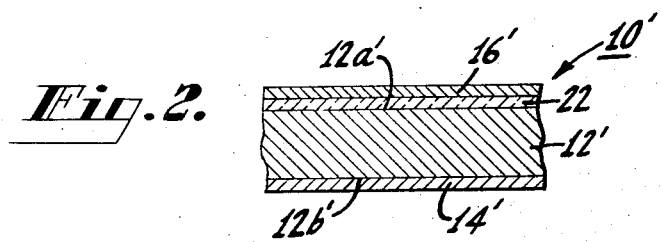
FIG. 2 is a sectional view of another form of the laser element.

Referring to FIG. 2, another form of the laser element of the present invention is generally designated as 10'. Laser element 10' comprises a body 12' of a material which will generate light when excited by an electron beam, such as the same materials as that for the body 12 of the laser element 10 of FIG. 1. The body 12' has a pair of substantially parallel, spaced surfaces 12a' and 12b'. On the surface 12b' of the body 12' is a layer 14' of a material which will partially reflect light and partially transmit light therethrough, such as the materials for the layer 14 of the laser element 10 of FIG. 1. A layer 16' of an electrically conductive metal, such as the metals for the layer 16 of the laser element 10 of FIG. 1, extends over the surface 12a' of the body 12'. The metal layer 16' is of a thickness so as to substantially totally reflect light but allow electrons to pass therethrough. Between the metal layer 16' and the surface 12a' of the body 12 is a layer 22 of a dielectric material preferably of low density such as silicon dioxide or magnesium fluoride. The dielectric layer 22 is of a thickness to provide the appropriate spacing between the metal film 16' and the surface 12a' of the body 12.

The laser element 10' is used in the same manner as the laser element 10 of FIG. 1 with the electron beam being directed at the metal layer 16' to excite the material of the body 12' and the light generated in the body 12' being emitted through the layer 14'. The dielectric layer 22 spaces the metal layer 16' from the body 12' so as to reduce the power per unit area required to excite the material of the body 12' to its lasing threshold. Although the power required to achieve lasing of the laser element 10' is lower than a laser element having the metal layer directly on the surface of the body, it is not as low as achieved with the laser element 10 of FIG. 1 having the bubble in the metal film. The reason that the power threshold required for the lasing element 10' is higher than for lasing element 10 is believed to be caused by the dielectric layer 22 absorbing some of the electrons. The element 10' is formed by coating the surface 12a' and 12b' of the body 12 with the appropriate layers 22, 16' and 14'. As described with regard to the laser element 10 of FIG. 1, the layers can be applied by vacuum evaporation.

Figure 3:
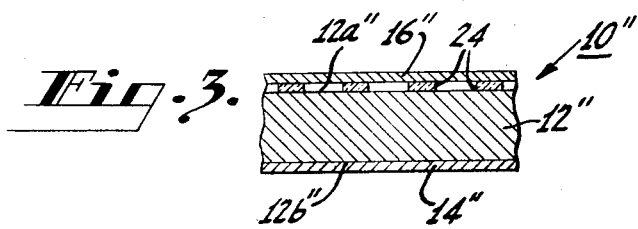
FIG. 3 is a sectional view of still another form of the laser element.

Referring to FIG. 3, still another form of the laser element of the present invention is generally designated as 10". Laser element 10" comprises a body 12" of a material which will generate light when excited by an electron beam. The body 12" has a pair of substantially parallel, spaced surfaces 12a" and 12b". On the surface 12b" of the body 12" is a layer 14" of a material which will partially reflect light and partially transmit light therethrough. A layer 16" of an electrically conductive metal extends over the surface 12a" of the body 12". The metal layer 16" is of a thickness so as to substantially fully reflect light but allow electrons to pass therethrough. The body 12", layer 14" and metal layer 16" are of the same materials as the body 12, layer 14 and metal layer 16 respectively of the laser element 10 of FIG. 1. The metal layer 16" is spaced from the surface 12a" of the body 12" by a plurality of spaced pedestals 24 on the surface 12a" of the body 12". The pedestals 24 are either small dots, narrow strips or a grid pattern of either a metal, such as the same metal as the layer 16", or a dielectric material, such as silicon oxide or magnesium fluoride. The pedestals 24 are of a height to provide the appropriate spacing between the metal film 16" and the surface 12a" of the body 12".

The laser element 10" is used in the same manner as the laser element 10 of FIG. 1 with the electron beam being directed at the metal layer 16" to excite the material of the body 12" and the light generated in the body 12" being emitted through the layer 14". The electron beam is directed at the metal layer 16". As described with regard to the laser element 10 of FIG. 1, when the electron beam passes through the areas between the pedestals 24, the spacing between the metal film 16" and the body 12" reduces the electron power per unit area required to excite the material of the body 12" to its lasing threshold.

To make the laser element 12", the layer 14" is coated on the surface 12b" of the body 12, such as by vacuum evaporation. The pedestals 24 can be formed on the surface 12a" of the body 12" by first coating the entire surface 12a" with a layer of the material of the pedestals such as by vacuum evaporation. A masking layer of a suitable resist material is then coated on the areas of the pedestal forming layer which are to be the pedestals using standard photolithographic techniques. The uncoated portions of the pedestal forming layer are then removed using a suitable solvent, and the masking layer is removed with a suitable solvent. This leaves the pedestals 24 on the surface 12a". The pedestals can also be formed by vacuum evaporation through a mask. A sheet of an easily vaporizable material, such as collodion, is then placed over the surface 12a" of the body 12" in contact with the top surfaces of the pedestals 24. The metal layer 16" is then coated on the easily vaporizable material, such as by vacuum evaporation. The laser element 10" is then heated in air to vaporize and remove the easily vaporizable material leaving the metal film 16" seated on the pedestals 24.

I claim:
1. An electron beam excited laser comprising
   a. a body of a semiconductor laser material which will generate light when excited by an electron beam,
   b. a light reflective, electron permeable layer of an electrically conductive metal covering a surface of the body, said metal layer being of a thickness so as to substantially fully reflect the light generated in the body but transmit the exciting electrons, and at least a portion of said metal layer being spaced from said surface the space between the metal layer and the said surface of the body being permeable with respect to the exciting electrons so that the exciting electrons can reach said body, and
   c. means for applying a beam of electrons to at least the portion of said metal layer which is spaced from said body so that said electrons pass through said metal layer and said space to said body to provide enhanced operation of said laser.
2. A laser in accordance with claim 1 in which the metal layer is coated on said surface of the body and has a bubble therein to space a portion of the metal layer from said surface of the body.
3. A laser in accordance with claim 2 in which the metal layer has a plurality of spaced bubbles therein to provide a plurality of regions which are spaced from said surface of the body.
4. A laser in accordance with claim 1 including means between the said surface of the body and the metal layer spacing the entire area of the metal film from said surface of the body.
5. A laser in accordance with claim 4 in which the means spacing the metal layer from said surface of the body is a layer of a dielectric material on said surface of the body and the metal layer is on the dielectric layer.
6. A laser in accordance with claim 4 in which the means spacing the metal layer from said surface is a plurality of spaced pedestals on said surface of the body and the metal film extends over said surface of the body and is on the pedestals.
7. A laser in accordance with claim 1 in which the distance between the spaced portion of the metal film and said surface of the body is approximately one-fourth the wavelength of the light generated by the body.

* * * * *